United States Patent [19]
Oros

[11] 3,902,075
[45] Aug. 26, 1975

[54] CAR ANTI-THEFT DEVICE

[76] Inventor: Stefan Oros, 755 Anderson Ave., Cliffside Park, N.J. 07010

[22] Filed: Dec. 20, 1973

[21] Appl. No.: 426,447

Related U.S. Application Data

[63] Continuation of Ser. No. 259,917, June 5, 1972, abandoned, which is a continuation-in-part of Ser. No. 225,446, Feb. 11, 1972.

[52] U.S. Cl. .............. 307/10 AT; 340/64; 180/114
[51] Int. Cl. ............................... H02g 3/00
[58] Field of Search .... 307/10 AT, 10 R; 200/42 R, 200/44, 45; 340/64; 180/114; 317/134

[56] References Cited
UNITED STATES PATENTS

| | | | |
|---|---|---|---|
| 2,140,812 | 12/1938 | Ratti | 307/10 AT |
| 2,455,998 | 12/1948 | Hoye | 200/146 R |
| 3,004,170 | 10/1961 | Greenspan | 307/10 AT |

*Primary Examiner*—Herman Hohauser
*Attorney, Agent, or Firm*—Auslander & Thomas

[57] ABSTRACT

Divided leads from an automobile electrical system optionally including low voltage systems have two ends arbitrarily set in a receptacle. A male plug with wire pairs of pins fits into the receptacle to complete the circuitry, free of high voltage arcing. The plug may be substituted for an ignition key and starter lever.

23 Claims, 16 Drawing Figures

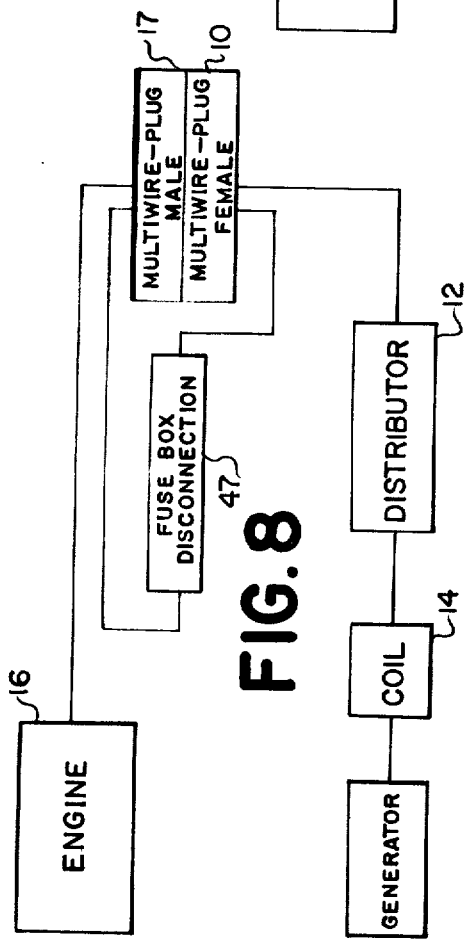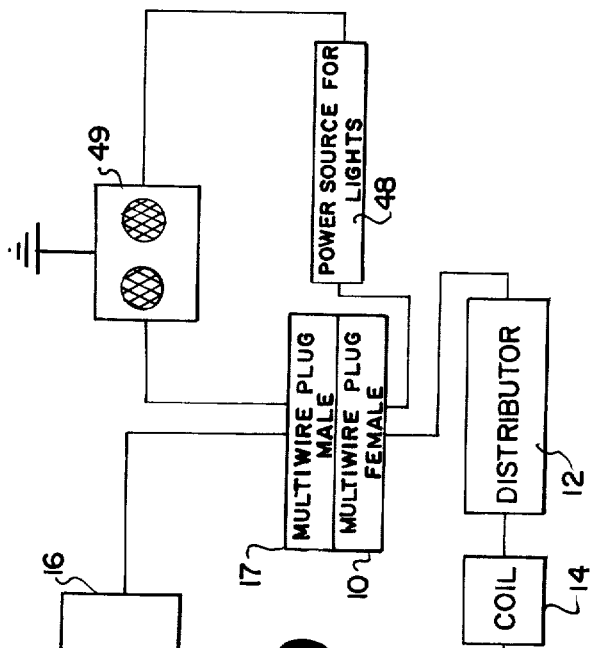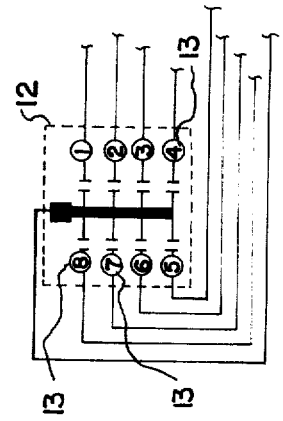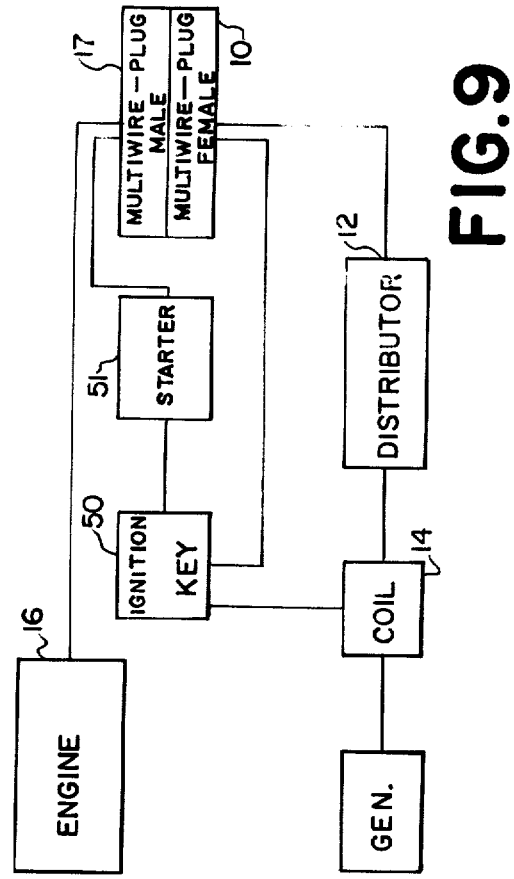

3,902,075

CAR ANTI-THEFT DEVICE

Cross Reference the Present Application as a Continuation of the invention as described in co-pending Ser. No. 259,917 now abandoned filed June 5, 1972, which is a continuation in part of Ser. No. 225,446, filed Feb. 11, 1972.

The present invention relates to a car anti-theft device involved with the ignition system and electrical system of a car adaptable for use as an ignition key and starter actuator which is a continuation of the invention as described in co-pending Ser. No. 259,917 filed June 5, 1972, which is a continuation in part of Ser. No. 225,446, filed Feb. 11, 1972.

In the past, innumerable devices have been employed to frustrate the car thief.

In the past, many devices have attempted to separate the various wires in the electrical system, then code them so that a decoding key would set the electrical system operating again.

Many of such systems have been in series with the high voltage of the induction coil which provides the spark for the spark plug. Another electronic device has used a transistor to form a complicated key gating system biased to cut off the induction coil unless the proper key is supplied.

The transistorized system is complicated to construct, or it may be simple to unravel or be jumped by an experienced thief.

The high voltage systems may carry from 15,000 to 20,000 volts. Thus, though locking permutations and combinations may be worked out as keys or combination locks in the system, combination locks of the past tended to erode their contacts by sparking once contact was made, or worse still, high voltage may arc to adjacent contacts.

According to the present invention, an anti-theft lock is provided which, when the proper key is applied, will complete the electric circuitry, though the spark plugs, induction coil, electrical system and distributor, all this without the danger of arcing.

The device may also be used as a starter actuator. Provision is also made for increasing theft difficulty and the key permutation and combinations by the optional inclusion of the low volt systems in the key. The key may include a starter actuator. Secondary precautions are also provided.

Although such novel feature or features believed to be characteristic of the invention are pointed out in the claims, the invention and the manner in which it may be carried out may be further understood by reference to the description following and the accompanying drawings.

(FIG. 1a is a detail of an optional wiring system at the distributor.)

FIG. 8 is a block diagram of the fuse box included in an anti-theft circuit of the present invention.

FIG. 9 is a block diagram of the ignition lock and starter of the present invention.

FIG. 10 is a block diagram of the lighting system of the present invention.

FIG. 15 is a detail of an optional wiring system at the distributer.

Referring now to the figures in greater detail, where like reference numbers denote like parts in the various figures.

Figure 1:
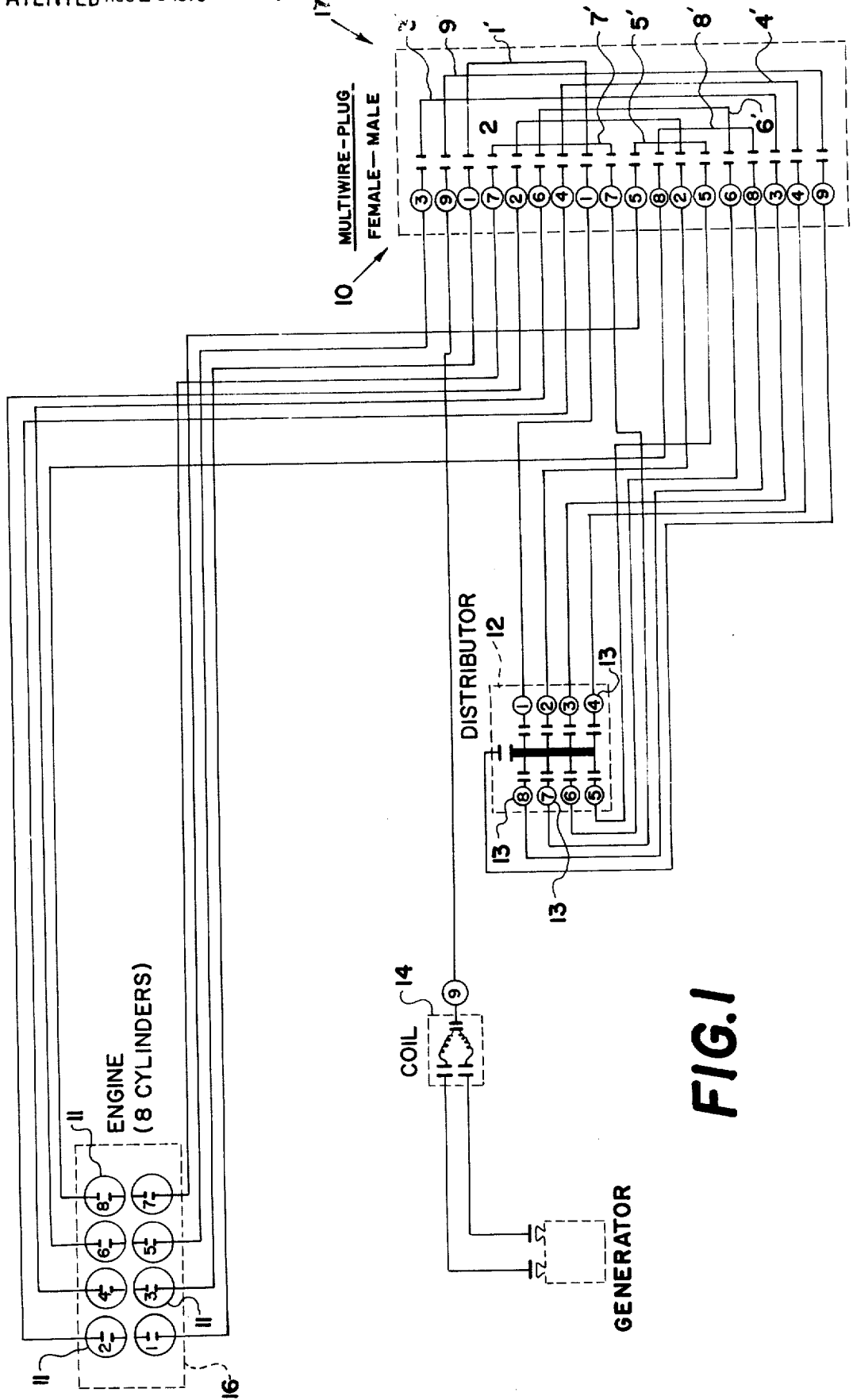
FIG. 1 is a schematic of the key and ignition system of the anti-theft device of the present invention.

As shown in FIG. 1, the electric leads 1–9 all have two random selected endings in the female receptacle 10. Thus, each wire from the spark plugs 11 leads to the female receptacle and each wire from the distributor 12 points 13 corresponding to the spark plugs 11 also lead to the female receptacle at a differenct point.

The lead wire 9 from the induction coil 14 goes to the female receptacle 10 at one point and the input wire 9 from the distributor 12 goes to the female receptacle 10 at another point.

The male plug 17, as shown in FIG. 1, is wired to decode the breaks in the circuitry by matching up the two ends of the wires 1–9, the wires 1–9 to be able to complete the necessary circuitry.

The nine leads as shown in FIG. 1 are exemplary in number, there may be more or less as hereinafter set forth.

In FIG. 1a, the same system as set forth in FIG. 1 is shown without any break in the leads from the coil 14 and the lead into the distributor 12. The openings 22 and pins 20 for these leads may be omitted from the male plug 17 and female receptacle 10 are used for other broken leads, as will be hereinafter shown.

It can thus be seen that the chance element of a thief being able to decode the key to make the engine 16 function is quite remote.

Figure 2:
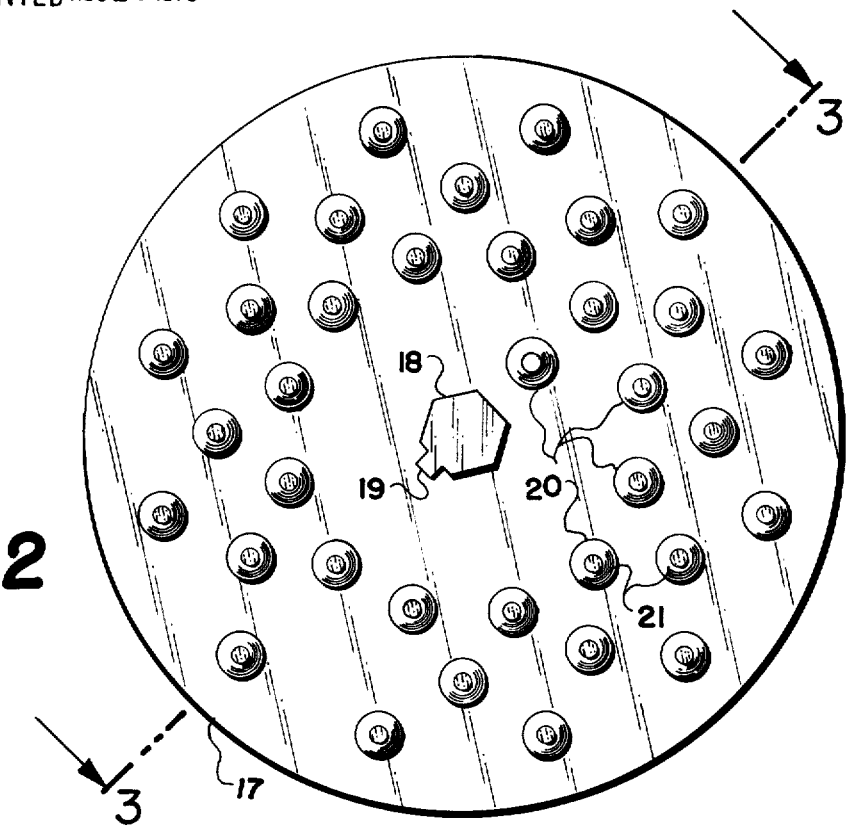
FIG. 2 is a bottom plan view of a key of the present invention.

In FIG. 2, one form of male plug is shown with a guide pin 18 which has a keyway 19 on the guide pin 18.

Figure 3:
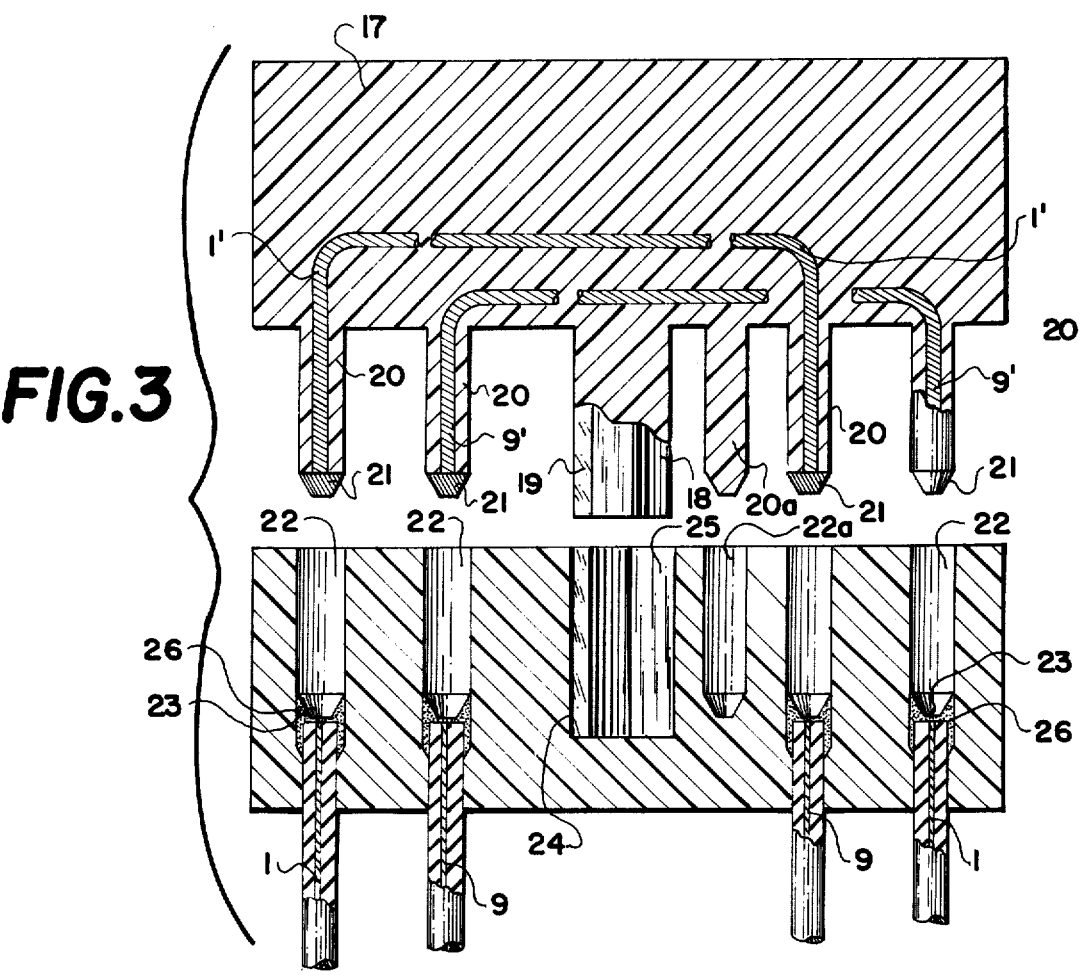
FIG. 3 is an exploded section of an elevation of the key and female receptacle of the present invention along lines 3—3 of FIG. 2.

In FIG. 3, the wires 1'–9' are shown in this circuit from inside the male plug 17. The pins 20 have contacts 21 at their ends. The contacts are electrically connected to the leads 1'–9' paired with the pins 20.

As shown in FIG. 3, a dummy pin 20a, or more than one may be included, matching dummy openings 22a to further raise the permutations and combinations for unravelling the leads 1–9, 1'–9' and further frustrate a thief.

The female receptacle 10, generally on the dashboard or some other convenient part of a car, has openings 22 adapted to receive the pins 20, the leads 1–9, each having two contact points 23 which mate with the contacts 21 of the pins 20 to complete the circuitry when all the paired pins 20, contact 21 and leads 1'–9' are in the proper order.

The female receptacle is preferably provided with a groove 24 matching the keyway 19 so that the proper positioning of the pins 20 in the openings 22 may be effected as the guide 18 enters the opening 25.

As can be seen in FIGS. 2 and 3 the contacts 21 on the pins 20 are substantially conical. The contacts 23 in the female receptacle 10 openings 22 preferably have a conductor superstructure 26 to mate with the contact 21 to give complete contact once the female receptacle 10 and male plug 17 have been joined.

Figure 4:
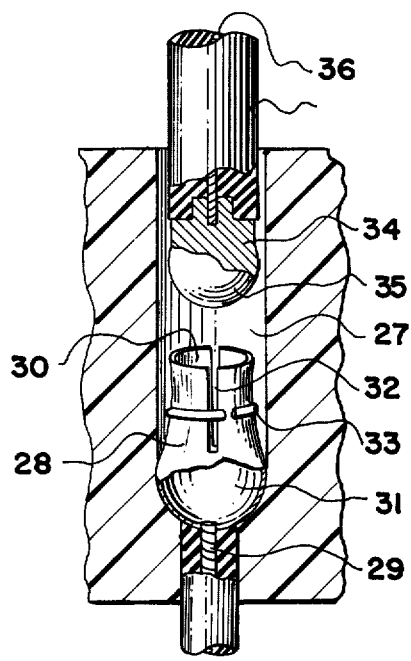
FIG. 4 is a partial section of an alternate male and female contact of the present invention.

Good contact is very important, especially because of the high voltage coming from the coil 14 through the ignition system. In FIG. 4, an individual exemplary female receptacle opening 27 with a contact 28 off a lead 29 is shown. The contact 28 has a narrower opening 30 than the base 31 and preferably has slits 32 and an engirdling ring 33 held in place by a slight flare of the opening 30.

The pin 34, contact 35 with its lead 36 springs the slit 32 at the opening 30 past the c ring 33 and the contact 35 is held firmly by the c ring 33, the resilience of the contact 28 and the balloon shape of the contact 35.

Figure 5:
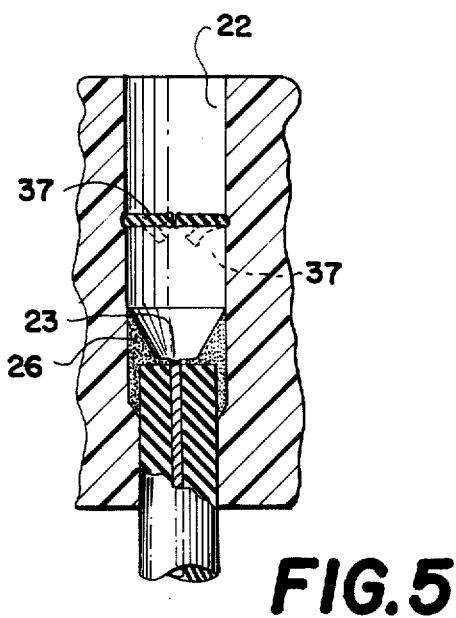
FIG. 5 is a partial section of another alternate female contact of the present invention.

In FIG. 5, a female contact 23 with an opening 22, such as shown with a washer-like closure 37, yieldable to allow the pin 20 to pass through. The washer-like closure 37 tends to grasp the pin 20 when inserted and tends to keep the contacts 23, 26 free of contamination when not in use.

Figure 6:
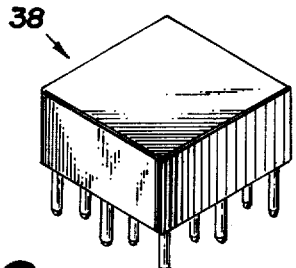
FIG. 6 is a perspective view of another optional shape of the key plug of the present invention.

In FIG. 6, another arbitrary shape of a male plug 38 is shown.

Although the circuitry decoded by the male plug 17 and female receptacle 10 is adequate to frustrate a car thief, the anti-theft device of the present invention may not be infallible, as will be explained more fully hereafter.

Figure 7:
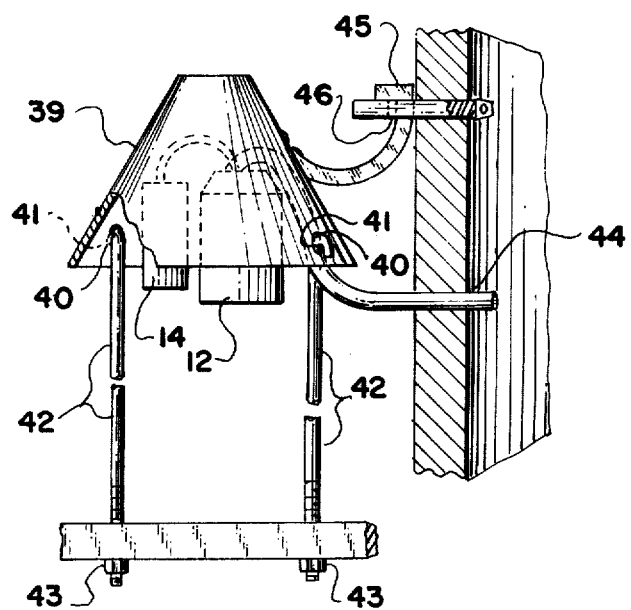
FIG. 7 is a view of a cover of the present invention protecting the coil and distributor.

To further frustrate theft, other means may be advisable. As shown in FIG. 7, a metal hood 39 is fastened down, covering the coil 14 and the distributor 12. The hood 39 is of strong metal and has at least two openings 40 into which S hooks 41 of tempered steel rods 42 can grasp the hooks 41 and be bolted down with nuts 43 to a normally inaccessible portion of an automobile chassis. The hood 39 may be self braced on the distributor 12 and coil 14, or may further be attached to an upright portion 49 of an automobile hooked onto a tempered steel hook 45 passing through an opening 46 in the hood 39. Thus, unless the hook 45 is cut or the S hooks 41 are released, the coil 14 and distributor 12 are inaccessible.

In operation, the leads 1–9 are arbitrarily placed in the female receptacle 10. From the spark plugs 11 corresponding leads 1–8 in the spark plug circuit are arbitrarily placed in the female receptacle 10. The lead 9 from the induction coil 14 and the input lead 9 from the distributor 12 are also arbitrarily placed in the female receptacle 10. Thus, there are nine pairs of broken leads 1–9 which must be connected in order for the engine of a car to work.

The male plug 17 is keyed to close the circuitry by having leads 1'–9' coded to reach the contacts 21 of pin 20 pairs or sets corresponding to the positioning of the leads 1–9 in the openings 22 of the female receptacle 10. Optional dummy pins 20a with dead contacts 21 may be used to raise the permutations and combinations to unlock the ignition system. The female receptacle 10 may have dummy openings 22a with contact points 23 and superstructure 26 to receive the dummy pins 20a.

A problem of the past in anti-theft devices interrupting the high voltage circuitry has been that the high voltage running to the spark plugs 11 would arc to adjacent contacts and frustrate the owner in not being able to use his car.

Aside from complicated solid state systems for setting up ignition code keys such as for controlling a biased SCR purely electrical system have suffered from the shortcomings of the high voltage on the ignition system when that has been used in anti-theft devices. The high voltage in the past has caused contact arcing and contact erosion.

According to the present invention, the male plug 17 is made of a dielectric material to throughly insulate the leads 1'–9' from each other. The pins 20 are spaced apart a sufficient distance to avoid likelihood of arcing and may be insulated by known insulation to withstand very high voltage. The general delineation of spacing depends upon the number of cylinders in the engine, which usually determine the voltage, say between 15,000 to 20,000 volts. The leads 1'–9' in the pins 20 are also surrounded by dielectric material so that the only exposure is at the contact points 21. The voltage and dielectric factors are just two of the determinative factors in the pin spacing.

The female receptacle 10, of course, must have the openings 22 spaced to fit the male plug 17. The length of the pins 20 and the depth of the opening 22 also influence the necessary spacing, but having pins 20 in a system such as that of the present invention, a simple arrangement controls the entire ignition system and electric system and has many permutations and combinations for coding.

As a further precaution, the contacts 21 are shaped to snugly fit the contacts 23 and the conductor superstructure 26. Another snug contact is shown in FIG. 4. Another precaution against arcing is shown in FIG. 5 where the washerlike closure 37 serves as both a seal and insulation.

A secondary theft control is involved with the use of the hood 39 to cover the coil 14 and the distributor 12.

An experienced and determined thief encountering the car theft device of the present invention might bypass the device with a bit of effort by rewiring the distributor 12 and jumping the coil 14.

The hood 39 is made of a solid substance such as metal that does not admit of ease of breakage, the rods 42 are bolted to the chassis of the car at points making them inaccessible to easily unbolt the nuts 43. The rods 42 themselves, preferably of tempered steel, cannot be easily cut with a hack saw. By properly placing the ends of the rods 42, it might be necessary to either jack up the car or tow it away in order to get at the nuts 43 in order to start to rewire the distributor 12.

The complications and effort necessary to force operation of the car in the face of the anti-theft device of the present invention ought to discourage most thieves because of the time it would take to steal.

The rods 42 of course hold the hood 39 so that it cannot be lifted by the tempered steel hook 45 on the upright partition 44.

More than one hood may be necessary where the coil 14 and distributor 12 are spaced apart.

With or without the use of the hood 39, theft may be further deterred or rendered difficult, especially to be completed quickly, by the introduction of other elements of the electrical system disconnected into the female receptacle 10 and decoded by the contacts 21 in the pins 20. As shown in FIG. 8, the main fuse box 47, routed through the pins 20 and openings 22 as another power cutoff to be unravelled by the coding of the leads in the pins 20 and openings 22 with their respective contacts 21, 23.

In FIG. 9, the circuit between the ignition key 50 and the starter 51 is broken to be joined by the making of the plug 10 with the female receptacle 10.

In FIG. 10, the power source 48 for the lights 49 is broken, to be joined by the mating of the plug 10 with female receptacle 10.

The electrical systems as shown in FIGS. 8–10 may be combined in the male plug 17 and female receptacle 10 for adding more permutations and combinations for frustrating theft. Other of the important electrical circuits may be broken and added to the male plug 17 and female receptacle 10.

The increased combinations using non-ignition low voltage circuitry renders theft less likely. When subsidiary circuits are used, there is less need for the use of the hood 39 as a secondary protection.

The male plug 17 may be substituted for a key. An automobile is rendered inoperative without the male plug inserted, thus there is no need for a conventional key.

In the modern automobile the starter 51 is usually actuated at the ignition lock. The male plug 17 and female receptacle 10 may be joined to have actuatable contacts to turn the starter 51.

Figure 11:
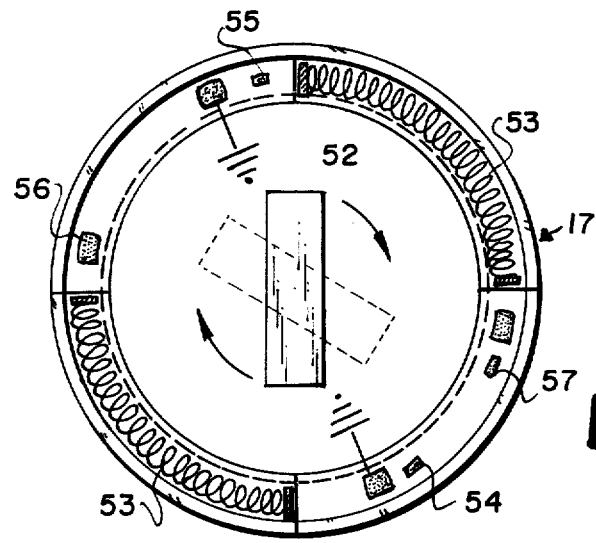
FIG. 11 is a cut-away plan view of a key plug including a starter actuating mechnism of the present invention.

In FIG. 11, a round male contact 17 includes a grip 52 which is biased by springs 53 so that the starter 51 contacts 54, 55 are spaced away from the starter switch contacts 56, 57. Rotating the grip 52 brings the contacts 54, 57 and 55, 56 into contact to actuate the starter release, returning the contacts 5b, 57 to their normal position.

Figure 12:
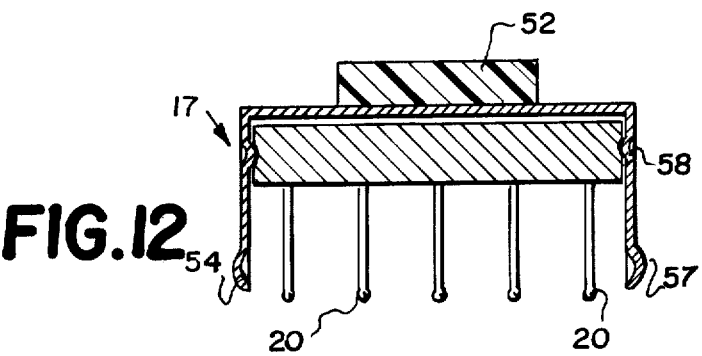
FIG. 12 is a partially cut-away view showing a key plug and another embodiment of a starter actuating mechanism of the present invention.

In FIG. 12 a different configuration of spring biased starter actuator is shown having a grip 52 and a circumferential wall 58 rotatable to actuate the starter by engaging the contacts 57.

Figure 13:
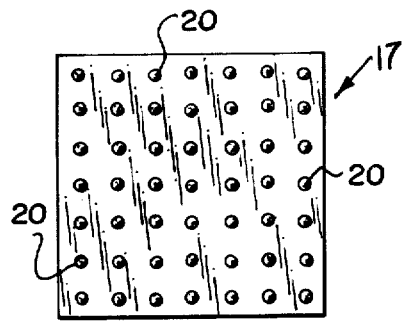
FIG. 13 is a bottom plan view of a square key plug of the present invention including starter actuating means.
Figure 14:
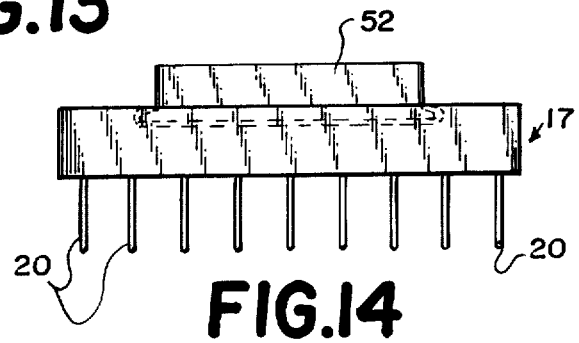
FIG. 14 is a front elevation of the key plug of FIG. 13 showing its starter actuating means.

In FIG. 13 a non-round male plug 17 is shown from a bottom plan view. This male plug 17 may employ a mechanism such as shown in FIG. 11 as can be seen in the elevation shown in FIG. 14.

The terms and expressions which are employed are used as terms of description; it is recognized, though, that various modifications are possible.

Having thus described certain forms of the invention in some detail, what is claimed is:

1. An automobile anti-theft device operable within the high voltage circuitry of an automobile ignition system comprising, said ignition system including high voltage output means, at least one fuel ignition means and at least one lead between said high voltage output means and at least one said fuel ignition means, a female receptacle including no less than four recessed openings, at least one of said leads between said high voltage output means and said fuel ignition means severed, said severed portions engaged in at least two optionally selected said female openings each opening including one part of one of said severed high voltage output means to fuel ignition means, and a male plug including no less than four pins, at least four of said pins in pairs including a contact lead to a second of said paired pins, said male pins interfitable with said female openings, said pins contactable with high voltage including insulation along its length to expose only a small portion to make contact with a lead in said female opening.

2. The invention of claim 1 wherein said female receptacle and male plug are substantially of a dielectric material.

3. The invention of claim 2 wherein said severed leads are joined to contact points.

4. The invention of claim 2 wherein said contact points in said male pins fit snugly with said contact points in said female receptacle.

5. The invention of claim 3 wherein the spaces between said lead contact points are spaced at a distance great enough to avoid arcing of normal high voltage in said leads.

6. The invention of claim 2 including contact points adapted to make snug contact.

7. The invention of claim 2 wherein said contact points in said male pins and said contact points in said female openings are spaced apart a distance selected to avoid arcing of normal high voltage to contacts not in normal circuitry.

8. The invention of claim 2 including a guide pin and opening.

9. The invention of claim 8 including a keyway and groove.

10. The invention of claim 2 wherein at least one of said female openings does not include a lead.

11. The invention of claim 2 wherein at least one female opening includes a washer-like closure between its opening and said opening's contact.

12. The invention of claim 2 wherein said contact in said female receptacle is adapted to hold said male pin in a spring-like grasp.

13. The invention of claim 2 including a distributor and hood means over said high voltage output means and said distributor.

14. The invention of claim 13 including means on said hood means fastening said hood means to the body of a car.

15. The invention of claim 14 wherein said fastening means include tempered steel.

16. The invention of claim 15 wherein said tempered steel includes rods bolted inaccessibly to the body of a car.

17. The invention of claim 2 including automobile low voltage circuitry wherein random severed leads from at least one said low voltage circuit are connected to at least two contacts in said female receptacle.

18. The invention of claim 2 wherein all spark plug leads in said car are disconnected and in said female receptacle openings.

19. The invention of claim 2 including an automobile distributor wherein the severed leads between said distributor and said high voltage output means are connected in said female opening.

20. The invention of claim 2 including moveable contacts, said contacts adapted to be moved to said car's starter actuation contacts whereby said starter is actuated.

21. The invention of claim 20 wherein said contacts are spring biased away from said starter contacts.

22. The invention of claim 21 including a rotatable grip.

23. The invention of claim 20 wherein said moveable contact is located in a male plug and is actuatable to be in circuit with said starter circuit.

\* \* \* \* \*